United States Patent [19]

Addeo et al.

[11] Patent Number: 5,512,232
[45] Date of Patent: Apr. 30, 1996

[54] DEVICE FOR MOULDING ARTICLES OF COMPOSITE MATERIAL AND PROCESS USING SUCH A DEVICE

[75] Inventors: Antonio Addeo, Novaro; Roberto Bonari, Cerro Maggiore; Aurelio Biscotti, Cantalupo di Cerro Maggiore, all of Italy

[73] Assignee: Centro Sviluppo Settori Impiego S.r.l., Italy

[21] Appl. No.: 323,355

[22] Filed: Oct. 14, 1994

[30] Foreign Application Priority Data

Oct. 15, 1993 [IT] Italy .................... MI93A2198

[51] Int. Cl.$^6$ .................................................. B29L 70/48
[52] U.S. Cl. ............... 264/240; 264/257; 264/328.6; 425/120; 425/128; 425/129.1; 425/562
[58] Field of Search .................... 264/240, 257, 264/258, 328.6; 425/120, 128, 129.1, 573, 562, 564, 566

[56] References Cited

U.S. PATENT DOCUMENTS

| 3,794,451 | 2/1974 | Breer et al. ........................ 425/573 |
| 3,847,526 | 11/1974 | Fries ................................. 425/564 |
| 3,933,312 | 1/1976 | Fries ................................. 425/564 |
| 4,210,616 | 7/1980 | Eckardt et al. ..................... 425/573 |
| 5,039,293 | 8/1991 | Knipp et al. ....................... 425/566 |
| 5,215,762 | 6/1993 | Eder et al. ......................... 425/566 |
| 5,424,017 | 6/1995 | Hinduja et al. ..................... 264/257 |
| 5,445,781 | 8/1995 | Addeo et al. ..................... 264/328.6 |

FOREIGN PATENT DOCUMENTS

| 0529651 | 3/1993 | European Pat. Off. . |
| 57-21415 | 2/1982 | Japan .................... 264/240 |
| 63-21110 | 1/1988 | Japan .................... 264/240 |
| 63-21109 | 1/1988 | Japan .................... 264/240 |

*Primary Examiner*—Robert Davis
*Attorney, Agent, or Firm*—Bryan Cave; David M. Klein

[57] ABSTRACT

A device for moulding articles of composite material includes a pressurizable gasket and an injection head the end of which is flush with the impression of the mould. After low-pressure filling the mould impression with jets of resin and catalyst so oriented as to secure the mutual mixing thereof, the pressurizable gasket allows the half-moulds to be further approached to each other and obtaining thereby the impregnation of the reinforcer element previously charged into the mould impression.

4 Claims, 2 Drawing Sheets

DEVICE FOR MOULDING ARTICLES OF COMPOSITE MATERIAL AND PROCESS USING SUCH A DEVICE

BACKGROUND OF THE INVENTION

1. Field of the Invention

The present invention relates to a device for moulding articles of composite materials. More particularly, the present invention relates to a device comprising a female half-mould designed to receive a reinforcer fibrous material, a male half-mould designed to get tightly closed onto said female half-mould and feeding means in order to feed the suitable resin for impregnating the reinforcer material.

2. Description of the Related Art

The presently used processes for moulding articles of composite materials (based on a thermosetting resin and a reinforcer material) provide for a pre-catalysed resin to be injected into a mould in which a reinforcer material was previously charged, as interlaced fibres (fabric), or as a non woven fabric (mat).

The equipment used in such technology, commonly referred to as "RTM (Resin Transfer Moulding)", require that the resin is considerably pressurized in order to enable the reinforcer material to be completely impregnated, as well as a cleaning system for the pre-catalysed resin injection nozzle in order to prevent said nozzle from accidentally clogging. The second drawback was obviated by using separate nozzles for feeding non-pre-catalysed resin and catalyst, leading into a mixing chamber inside which a self-cleaning ram is slidingly assembled. Such a solution, disclosed in European Patent Application EP-A-529,651, requires high injection pressures which, besides increasing the complexity and cost of equipment used, implies the risk that a back mixing of resin and catalyst takes place inside said nozzles.

A further, well known, moulding technique, referred to as "Compression Moulding" provides for the pre-catalysed resin to be fed into a half-mould containing the reinforcer material, followed by closing the half-mould, with consequent reinforcer element impregnation. Such a technique, poorly automated, requires that the resin and catalyst are pre-mixed and a predetermined Mount of resin/catalyst mixture is subsequently added to the female half-mould. Clearly, such a technique is neither suitable for high throughput rates (fast manufacturing cycles), nor does it allow highly reproducible results to be achieved.

SUMMARY OF THE INVENTION

The purpose of the present invention is to provide a device of the type hereinbefore specified, which does not display the above said drawbacks, and furthermore allows the costs to be reduced, as compared to prior equipment, using high-pressure injection of resin and catalyst.

Such a purpose is achieved by a resin feeding means comprising a recessed seat provided at the surface of the mould impression in the male half-mould, a closing ram sliding inside said recessed seat and suitable for being moved to a back (retracted) position and a forward (extended) position substantially flush with the impression in the half-mould, one pair of nozzles for respectively feeding resin and catalyst, arranged inclined to the axis of said ram and opening through the side walls of said recessed seat, with the inclination of the nozzles being such as to secure a mixing of resin and catalyst jets to take place substantially outside of said recessed seat in a mutually spaced apart configuration of said half-moulds.

Because of these characteristics, resin and catalyst (wherein by "catalyst", any mixtures of catalyst, accelerants, possible inhibitor, and so forth, are meant), can be fed at lower pressures than those used in RTM technology, while simultaneously ensuring that a sufficient blending will take place due to the confluence of resin and catalysts jets. The impregnation of the reinforcer element is not achieved by high resin feeding pressures, but by the following mutual sealing/clamping of the half-moulds. Furthermore, the risk of resin and catalyst back mixing inside the interior of the rescessed seat, which might lead to clogging of the nozzles and/or of the closing ram, are prevented.

The position of the closing ram, in the step during which the half-moulds are mutually sealed/clamped, ensures the absence of risers and consequent scraps. The "open-mould-injection" technology furthermore allows the problems of fibre washing by the closed-mould-injected resin, to be prevented.

According to a further feature of the present invention, the female half-mould comprises, perimetrically running around the mould impression, a groove inside which a hollow, pressurizable 0-ring is housed. The pressurizable gasket (0-ring) makes it possible for the mould closure tightness to be better controlled and for air to be more easily vented off during the moulding step.

BRIEF DESCRIPTION OF THE DRAWINGS

Further advantages and characteristics of the device according to the present invention will become evident from the following disclosure in detail, supplied for merely exemplifying, non-limitative purposes, by referring to the accompanying drawings, in which.

DETAILED DESCRIPTION OF THE INVENTION

Figure 1:
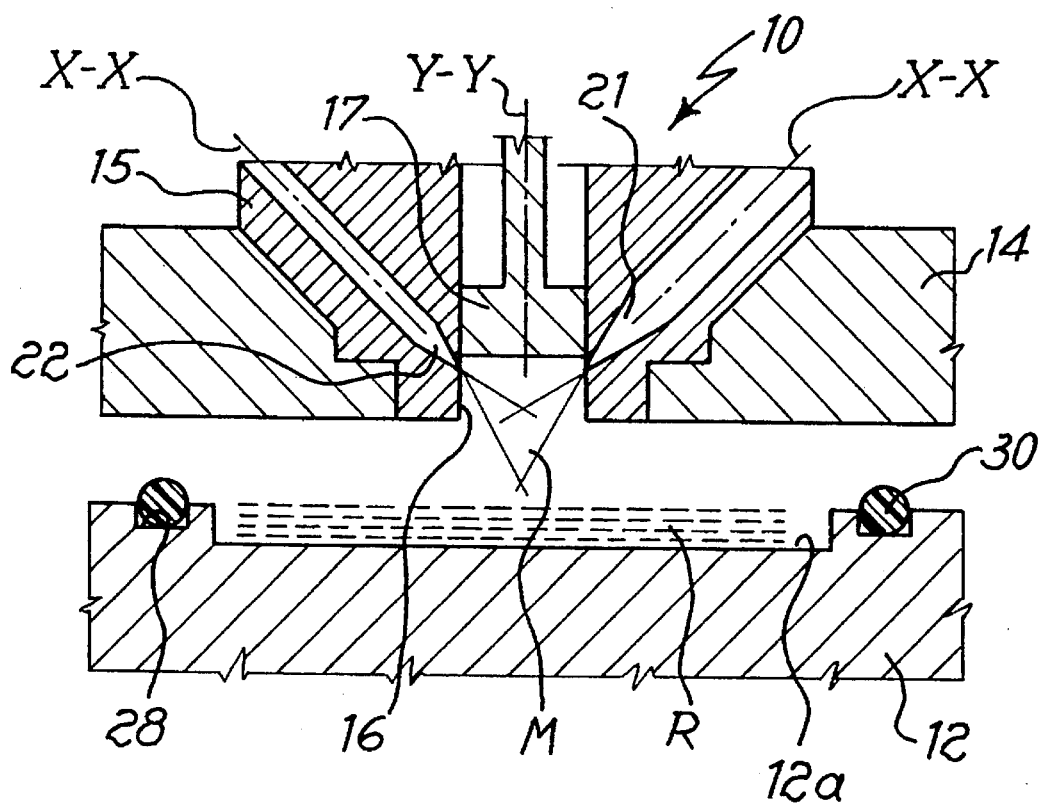
FIG. 1 is a cross-sectional schematic view of a device according to the present invention, in its resin/catalyst injection configuration.

Referring to the drawings, with (10) an apparatus for moulding manufactured articles of composite materials is generally displayed, which comprises a lower half-mould (female half-mould) (12) and an upper (male) half-mould (14).

The male half-mould (14) is centrally provided with an injection head (15) having a circular cylindrical well (16) inside the interior of which a closing ram (17) is slidingly installed, which is driven by pressurizing means (not illustrated).

Figure 4:
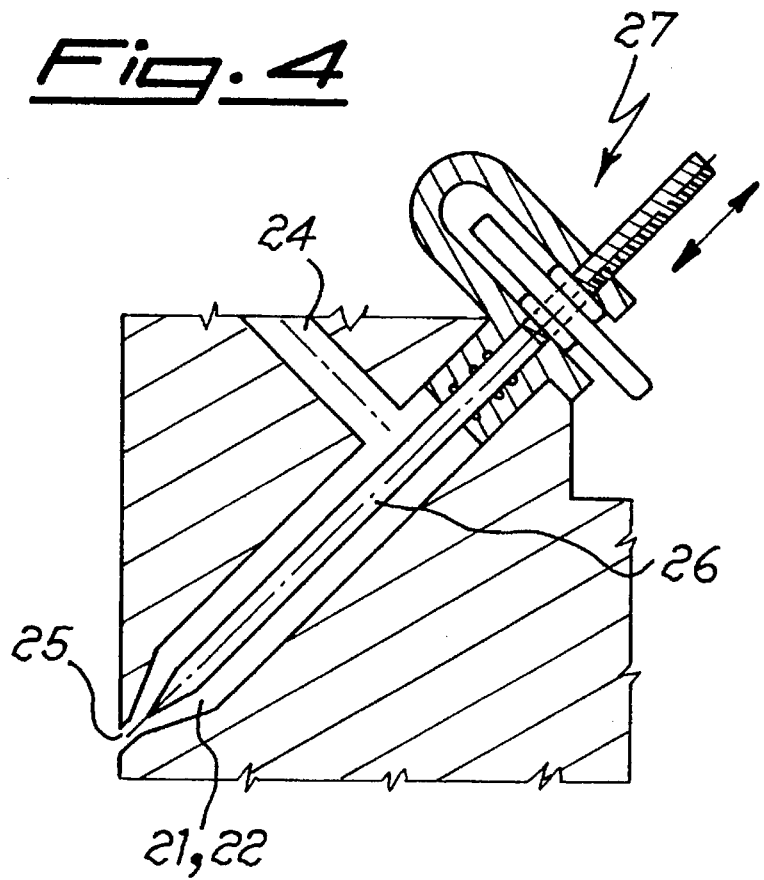
FIG. 4 is a detailed view of the flow control system of the nozzles.

The injection head (15) is furthermore provided with injection nozzles (21) and (22), for the resin and the catalyst, respectively, having their axes (X—X) inclined at 45° to the axis (Y—Y) of the ram (17). Each nozzle comprises an outlet bore (25) and a central pin (26) in order to regulate the nozzle outflow cross-section. The adjustment in position of the central pin (26) is realized by means of a screw-nutscrew system indicated with the reference number (27) in FIG. 4. In such a Figure, the feeding channel for feeding the catalyst, or the resin, to the nozzle, is also illustrated, as indicated with the reference numeral (24). The female half-mould (12) is provided with an impression (12a) perimetrically surrounded by a groove (28) inside which a hollow, pressurizable 0-ring (30) is housed.

At moulding time, inside the impression (12a) of the female half-mould (12) a reinforcer material (R), e.g., a fiberglass mat, is charged. The resin and the catalyst are then fed to the nozzles (21) and (22), respectively (FIG. 1), with the moulds being kept slightly spaced apart from each other, in such a way that the jets leaving the bores (25) of the nozzles get mixed outside of the well (16), preferably over the reinforcer element (R), in a region indicated with the reference character (M) in the drawings. During such a step, the closing ram (17) is kept in a retracted (back) position, so as not to interfere with the nozzles.

Figure 2:
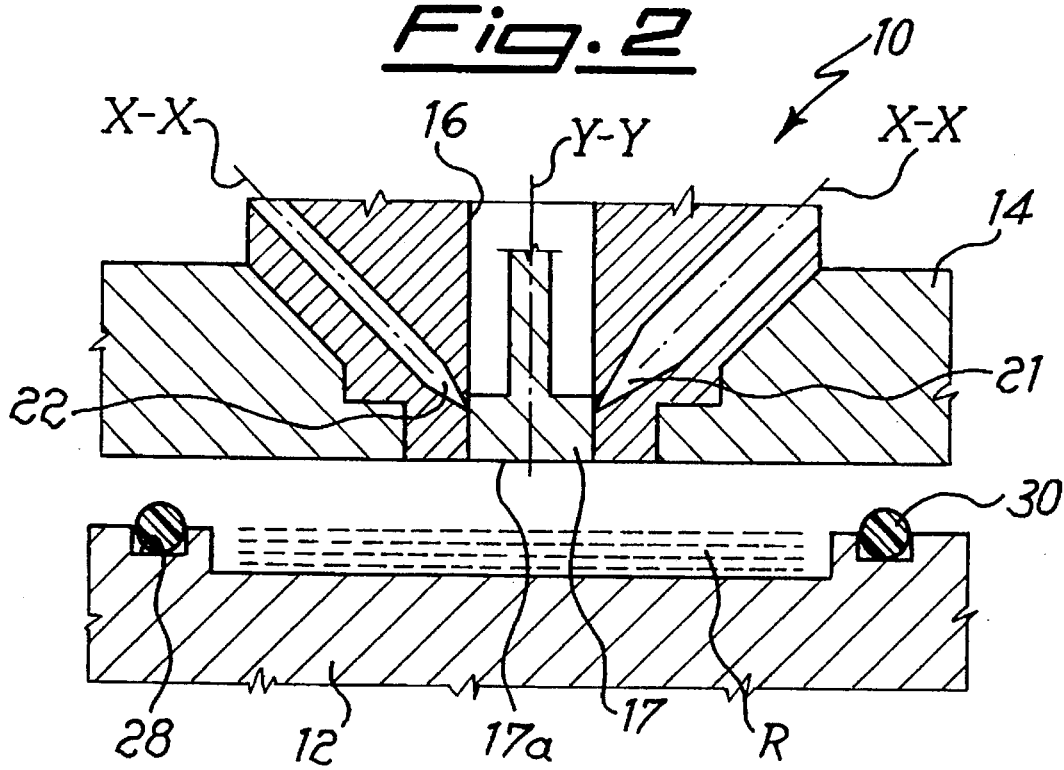
FIGS. 2–3 are analogous views to FIG. 1, and illustrate two successive steps of the moulding process.

During the subsequent step, illustrated in FIG. 2, the ram (17) is so moved that its flat end face, indicated with the reference numeral (17a), comes to a position flush with the surface of the mould of the male half-mould, simultaneously closing the nozzles (21) and (22).

Figure 3:
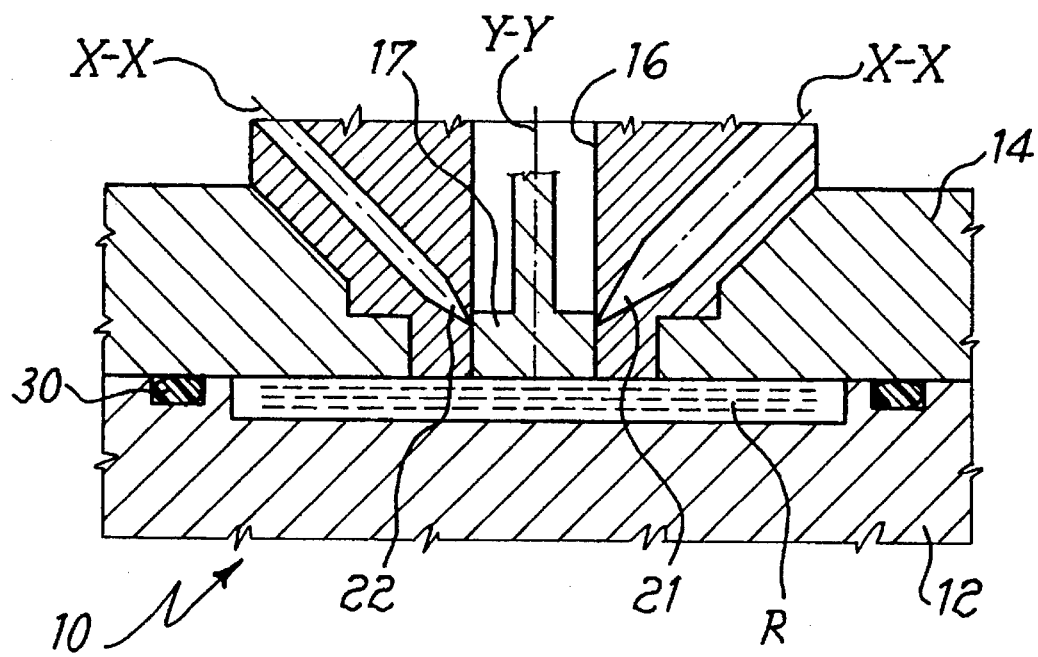

In such a configuration, the male half-mould (14) is closed onto the female half-mould (12) (FIG. 3), the tightness against resin leakages being secured by the pressurized 0-ring (30). At the end of resin curing, the mould is opened and the manufactured article is extracted.

In the case of particularly active resin/catalyst systems, extremely reduced time cycles, of the order of 3–5 minutes, can be attained, which are suitable for large-scale production cycles typical of the automobile industry.

The invention is further disclosed by referring to the following examples, which in no way shall be construed as being limitative of the scope of protection of the present invention.

EXAMPLE 1

An apparatus was used which consisted of two aluminum half-moulds, i.e., a male half-mould and a female half-mould, having a length of 1600 mm and an impression having a rectangular plan shape of 125 mm of width. The cross-section of the half-moulds had an isosceles trapezoidal shape, with bases of 90 and 125 mm and a height of 50 mm. The male half-mould was so shaped as to define, together with the female half-mould, a contoured impression of 4 mm of thickness, so as to make it possible a manufactured article to be produced with an "U" beam shape. The male half-mould bears, in its central portion, a resin and catalyst injection system of the above disclosed type. In this specific case, the ram has a diameter of 30 mm and said nozzles, arranged at 45° relatively to the side wall of the bore inside which the ram is installed, have different diameters and namely of 15 mm and 10 mm for the resin feeding nozzle and the catalyst feeding nozzle, respectively. Both nozzles have an outlet bore of 3 mm of diameter.

The pressurizable hollow gasket (0-ring) has a circular cross-section of approximately 10 mm of diameter, and is connected with a compressed air supply. The half-moulds are fastened to the platens of a PKO 1515 press manufactured by OMS company. The impressions of both half-moulds were subsequently treated with ELKOAT 441 mould release agent manufactured by Elgadi Chemicals. Inside the interior of the female half-mould a mat of single-filament fiberglass available from VETROTEX, of approximately 4 mm of thickness and weighing 470 g, heat pre-formed at the temperature of 150° C., so as to be suitable for being entered into the impression, was then charged.

Keeping both half-moulds at the temperature of 100° C. and spaced apart from each other, at a distance of 50 mm, 100 g/s of SIRESTER FS 0940/R resin manufactured by Sir Industriale and 5 g/s of LUPEROX GZN catalyst available from Elgadi Chemicals, both kept at the temperature of 23° C., were simultaneously injected with constant flow rate, during a time period of 40 seconds.

At the end of the injection step, the closing ram was moved to an end position in which it was flush with the lower surface of the male half-mould, by applying to it a pressure of about 25 bar, by means of a pump. The gasket was then pressurized at 3 bars and the male half-mould was lowered down onto the female half-mould, until a tight sealing was attained. The downwards movement of the male half-mould was then continued until both half-moulds came into mutual contact, with the 0-ring being forced to deform so as to be integrally contained inside its relevant groove.

The manufactured article, demoulded after about 3 minutes of mould closure, displayed the characteristics shown in Table 1. In order to determine the bending rigidity and the biaxial impact strength of the manufactured article, from it 8 disks of approximately 100 mm of diameter were obtained, the position of which is indicated in said Table 1 with reference numerals 1–8; disks 4 and 5 had their centres equidistant from the injection point and were the closest ones to the later, and disks 1 and 8 were the farthest disks from the injection point. The results reported in Table indicate that the values of bending rigidity are practically independent from the orientation relatively to the flowing resin stream and that the thermal treatment does not have any meaningful influence on the mechanical characteristics.

TABLE 1

| | | IN PRISTINE STATE | | | | POST-CURING 1 h at 120° C. | | | |
|---|---|---|---|---|---|---|---|---|---|
| | | POSITION ON THE SAMPLE FROM WHICH THE DISK WERE CUT | | | | | | | |
| Properties | Unit | 1 | 2 | 3 | 4 | 5 | 6 | 7 | 8 |
| Thickness | mm | 4.06 | 4.40 | 4.20 | 4.50 | 4.10 | 4.00 | 4.00 | 4.40 |
| Bending rigidity | | | | | | | | | |
| Reference angle 0° | GPa | 10.5 | 11.5 | 11.6 | 9.13 | 11.2 | 11.3 | 11.8 | 12.1 |
| Reference angle 90° | GPa | 9.8 | 10.6 | 11.1 | 10.0 | 11.15 | 10.9 | 10.8 | 11.2 |
| Impact strength by falling dart | | | | | | | | | |

TABLE 1-continued

| Properties | Unit | IN PRISTINE STATE | | | | POST-CURING 1 h at 120° C. | | | |
|---|---|---|---|---|---|---|---|---|---|
| | | POSITION ON THE SAMPLE FROM WHICH THE DISK WERE CUT | | | | | | | |
| | | 1 | 2 | 3 | 4 | 5 | 6 | 7 | 8 |
| Energy at 1st damage/thickness | N/mm | — | 1798 | 1640 | 1500 | 1591 | 1564 | 1847 | 1972 |
| Penetration at 1st damage | mm | — | 4.63 | 4.47 | 4.38 | 4.76 | 4.72 | 5.32 | 5.12 |
| Energy at 1st damage/thickness | J/mm | — | 3.95 | 3.54 | 3.19 | 3.46 | 3.32 | 4.16 | 4.79 |
| Energy at break/thickness | J/mm | — | 19.6 | 19.7 | 18.5 | 19.8 | 18.8 | 19.1 | 18.6 |
| FIBERGLASS % | | 41 | 49 | 48 | 47 | 46 | 48 | 47 | 46 |
| | | FIBERGLASS = 46% (a.v.)* | | | | FIBERGLASS = 47% (a.v.)* | | | |
| | | MODULUS = 10.5 GPa (a.v.)* | | | | MODULUS = 11.3 GPa (a.v.)* | | | |

* = average value

EXAMPLE 2

The same injection apparatus of Example 1 was used which this time was mounted in the central region of the upper half-mould of a circular mould of 380 mm of diameter, with an impression depth of 3 mm. Also in this case, outside the impression contour, an 0-ring was installed, which was similar to the 0-ring mentioned in Example 1.

The amount of materials used (the same components as of Example 1) was the following:

300 g of fiberglass mat (pre-formed according to the same modality as of Example 1);

17 g of catalyst;

350 g of resin.

By following the same operating modalities as disclosed in Example 1, manufactured articles were obtained in the form of disks of 380 mm of diameter and having an average thickness of 3 mm, the characteristics of which are reported in the following Table 2.

TABLE 2

| Thickness (mm) | 2.9 | 3 | 3 |
|---|---|---|---|
| Bending rigidity (Gpa) | 10 | 10 | 1.5 |
| Fiberglass (%) | 49 | 48 | 48 |

The characterizations were carried out, in this case too, on circular specimens of approximately 100 mm of diameter, obtained from the manufactured pieces.

We claim:

1. A device for manufacturing, by moulding, articles of composite material, the device comprising a female half-mould, having a mould impression, for receiving a reinforcer fibrous material, a male half-mould, having a mould impression, for being tightly closed onto said female half-mould, and feeding means to feed a resin for impregnating the reinforcer material, wherein said resin feeding means comprises:

a) a recessed seat in the mould impression of the male half-mould, the recessed seat comprising side walls;

b) a closing ram having an axis, the closing ram slidable in said recessed seat and moveable between a back (retracted) position and a forward (extended) position substantially flush with the mould impression of the male half-mould, and c) a pair of nozzles for feeding resin and catalyst respectively, arranged inclined to the axis of said ram and opening through the side walls of said recessed seat, with the inclination of the nozzles being such as to mix the resin and catalyst substantially outside of said recessed seat with said half moulds in a mutually spaced apart configuration.

2. The device according to claim 1, wherein said female half-mould comprises a groove perimetrically around its mould impression, inside which a hollow and a pressurizable O-ring positioned within the groove.

3. The device according to claim 1, wherein each nozzle comprises a flow control device comprising a pin regulator.

4. A process for moulding manufactured articles of composite material comprising the following steps:

a) placing a reinforcer fibrous material in the interior of a female half-mould, b) positioning a male half-mould opposite to, and spaced apart from, said female half-mould, the male half-mould comprising a central recessed seat inside which a closing ram is slidingly mounted and into which two inclined feed nozzles open for feeding resin and catalyst respectively, with the inclination of said nozzles being such as to mix the resin and catalyst substantially outside of the recessed seat, c) feeding said nozzles, with the closing ram in a retracted configuration, with resin and catalyst in amounts sufficient to subsequently impregnate the reinforcer material, d) moving the closing ram to a forward position substantially flush with a mould impression of the male half-mould, the closing ram simultaneously closing the nozzles, d) tightly closing the half-moulds against each other, so as to allow the catalysed resin to impregnate the reinforcer material and set, and e) separating the half-moulds from each other in order to allow the manufactured article to be demoulded.

* * * * *

UNITED STATES PATENT AND TRADEMARK OFFICE
CERTIFICATE OF CORRECTION

PATENT NO. : 5,512,232

DATED : July 30, 1996

INVENTOR(S): Antonio Addeo et al.

It is certified that error appears in the above-identified patent and that said Letters Patent is hereby corrected as shown below:

On the title page:

[75] Inventors: Replace "Novaro" by --Novara--.

Column 1, line 45: Replace "Mount" by --amount--.

Column 1, line 25: Replace "require" by --requires--.

Column 6, line 31: Delete ", inside which a hollow".

Signed and Sealed this

Twenty-second Day of October, 1996

Attest:

BRUCE LEHMAN

Attesting Officer    Commissioner of Patents and Trademarks